2,867,587
WATER-STABILIZED ZINC PHOSPHATE PHOSPHORS

Daniel J. Donahue, Lancaster, and Stanley A. Hoshowsky, East Petersburg, Pa., assignors to Radio Corporation of America, a corporation of Delaware No Drawing. Application November 1, 1954
Serial No. 466,202

3 Claims. (Cl. 252—301.6)

This invention relates to zinc phosphate phosphors and to methods and means for water-stabilizing zinc phosphate phosphors, and to luminescent screens comprising the phosphors of the invention.

Zinc phosphate with manganese activator is frequently used as the red-emitting phosphor for the luminescent screens of monochromatic and polychromatic kinescopes. The luminescent screens for kinescopes are prepared by depositing upon a substrate a thin layer of phosphor particles. The phosphor particles may be deposited by settling from an aqueous suspension of the phosphor, or by screening or printing from a water-based paste of the phosphor. The deposited phosphor is dried and then subjected to further processing steps. During these further steps, the phosphor is again contacted with water, for example, during the step of aluminizing the luminescent screen.

One of the difficulties experienced with zinc phosphate phosphors is that its luminescence is markedly reduced after particles thereof are contacted with water. This reduction in luminescence light output is permanent and cannot be recovered by subsequent drying or other means. Thus, in the manufacture of kinescopes including zinc phosphate phosphors, it is ordinarily necessary to carry out all of the processing steps in an organic solvent medium. Such processing is expensive, cumbersome and requires additional equipment to recover evaporated fumes in order to protect factory personnel and to reuse the solvents.

It is an object of the invention to provide improved methods and means for water-stabilizing zinc phosphate phosphors.

Another object is to provide improved zinc phosphate luminescent materials.

A further object is to provide water-stable compositions of matter including zinc phosphate and water.

Another object is to provide improved methods for preparing luminescent screens including zinc phosphate phosphors.

Another object is to provide improved luminescent screens including the zinc phosphate phosphors of the invention.

In general, the invention includes methods of water-stabilizing zinc phosphate phosphor particles in contact with an aqueous medium maintaining the medium in contact with said particles in the range of pH between 6.50 and 10. This may be accomplished in a number of ways, for example, by (1) incorporating up to 2% of zinc oxide into said zinc phosphate phosphor, or by (2) coating particles of said zinc phosphate phosphor with zinc hydroxide, or by (3) coating particles of said zinc phosphate phosphor by immersing said particles in an aqueous solution of an alkali silicate or by (4) mixing free zinc oxide into said aqueous medium or by (5) dissolving an alkaline reagent into said aqueous medium.

The invention includes compositions of matter comprising zinc phosphate phosphors stabilized according to the invention and also methods for preparing luminescent screens including the steps of water-stabilizing zinc phosphate phosphors according to the invention. The invention also includes luminescent screens comprising a layer of phosphor particles including the luminescent materials of the invention.

Example 1.—Slurry 100 grams of zinc phosphate precipitate containing 1.0% by weight of manganese as manganese phosphate, in about 300 cc. of water. Add 0.9 gram of zinc oxide powder and stir the suspension thoroughly for about 30 minutes in order to disperse the zinc oxide powder in the precipitate. Excess water is removed by decantation or filtration and the remaining solids dried at about 175° C. The dried powder is then fired at about 950° C. and finally milled in an organic medium such as carbon tetrachloride to deaggregate the crystals or reduce the particle size to that required for tube application. The luminescent material is believed to have the molar composition $Zn_3(PO_4)_2 : 0.07\ Mn_3(PO_4)_2$ with 0.042 mole zinc oxide dispersed in and/or on the surface of the phosphor crystals.

Although 0.9 gram of zinc oxide was added, between 0.6 and 2 grams may be added. This corresponds to 0.6 to 2% by weight of zinc oxide with respect to zinc phosphate. The wet solids may be dried at a temperature about between 125 and 250° C. and may be fired at a temperature of between about 800° C. to 1050° C.

A similar phosphor prepared by this method without zinc oxide will decrease in light output about 50% in 30 minutes when contacted with water. A phosphor prepared with zinc oxide does not show a substantial change in luminescent light output after several days when contacted with water.

Example 2.—An alternate method of coating with zinc oxide consists of precipitating zinc hydroxide on the unfired zinc phosphate particles and then firing the coated zinc phosphate particles. For example, slurry 100 grams of zinc phosphate precipitate containing 1.0% of manganese as manganese phosphate, in about 300 cc. of water. Add 17.6 cc. of an aqueous solution containing 10% by weight of zinc chloride. While stirring the slurry, add ammonium hydroxide solution until the suspension is approximately neutral (pH about 7). The zinc hydroxide which forms will deposit as a coating on the zinc phosphate particles in the suspension. The excess water is removed and the remaining solids washed 2 or 3 times to remove the by-product ammonium chloride. The washed product is then dried at about 175° C. Drying at about this temperature will decompose the zinc hydroxide coated on the zinc phosphate particles to zinc oxide. For the proportions recited, about 1% by weight of zinc oxide with respect to zinc phosphate remains in the dry solids. The dry solids may now be fired as described in Example 1.

Example 3.—Slurry 100 grams of zinc phosphate phosphor particles such as $\beta$-$Zn_3(PO_4)_2 : 0.07\ Mn$ with 300 cc. of water. While stirring, add about 30 cc. of potassium silicate solution containing about 12.5% by weight of solids. Stir the suspension for about 30 minutes, filter off the phosphor and then dry the filtered phosphor at about 175° C.

Although 30 cc. of potassium silicate solution is used, between 15 and 40 cc. of potassium silicate may be used in the example. Other silicates such as sodium silicate and lithium silicate may be used in place of potassium silicate. The filtered phosphor may be dried at temperatures between 125 and 250° C.

When the phosphors produced by the processes of Examples 1, 2, and 3 are immersed in water or otherwise contacted with water, the luminescence efficiency remains substantially unaffected due to the contacting with water. When similar phosphors are prepared without the incorporation of zinc oxide as described in Examples 1 and 2 or without the silicate coating produced in Example 3, the luminescence efficiency falls to at least about 70% of the original light output within 30 minutes due to the presence of water. It is believed that zinc phosphate phosphors in contact with water dissolve and a hydrated zinc phosphate reprecipitates from the solution. The precipitated, hydrated form of zinc phosphate has no red luminescence efficiency unless it is re-fired at about 950° C. Thus, even a thin coating of the hydrated zinc phosphate on the phosphor particles will produce a marked decrease in luminescence efficiency. In the processes of Examples 1, 2 and 3, auxiliary reagents maintain the pH of an aqueous medium in immediate contact with the phosphor particles at a pH above about 6.50 and below about 10. In so doing, the dissolution of zinc phosphate is reduced to a negligible rate.

The methods for effecting water-stabilization of zinc phosphate phosphors as described in Examples 1, 2 and 3 remain effective throughout the ordinary kinescope manufacturing procedures. Thus, in later process steps, when the deposited phosphor screen is subsequently contacted with water, the zinc phosphate particles retain their stability toward water. The phosphor particles prepared according to Examples 1, 2 and 3 may be slurried with water and then deposited in a thin layer upon a substrate by settling from a suspension, or by silk screening or other printing processes. Subsequently the deposited screen may be dried, subjected to other processing steps, again contacted with an aqueous medium and again dried, etc. without being adversely effected by the presence of water. A luminescent screen according to the invention comprises a layer of finely-divided phosphor particles including the luminescent materials prepared according to Examples 1, 2 and 3.

*Example 4.*—It is sometimes desired to prepare a paste which may be used for silk screening or printing zinc phosphate phosphors that have not been water-stabilized according to Examples 1, 2 or 3. A water-stable paste is prepared as follows: 61 grams of zinc phosphate phosphor, 2 grams of zinc oxide and 37 grams of a 50% polyvinyl alcohol solution in water such as Elvanol 52-2 marketed by the E. I. Du Pont de Nemours Company, Wilmington, Delaware, are milled to the requisite fineness. Where this mixture is milled without zinc oxide, the paste hardens to a rock-like consistency and the luminescence efficiency drops from 50 to 100% within 15 minutes. The presence of zinc oxide produces a paste which does not harden and which does not decrease in luminescence efficiency at least for a period of a week.

100 grams of the milled paste is then slurried with 87 grams of an aqueous solution containing 10% polyvinyl alcohol, 13 grams of methanol, a desired amount of water and a desired amount of a 10% ammonium dichromate solution. This slurry has a pH of about 7.7 and may be used for preparing luminescent screens by a conventional photo-resist process.

The amount of zinc oxide used corresponds to about 2% by weight of zinc oxide with respect to the total weight of milled paste. However, .4% to 4% by weight of zinc oxide may be used.

*Example 5.*—A water-stable zinc phosphate phosphor paste may be prepared exactly as described in Example 4 except that 0.1% of potassium hydroxide is substituted for the zinc oxide. The product has about the same degree of water-stability as the product of Example 4. Other soluble alkalies or alkaline materials may be used in place of potassium hydroxide, for example sodium hydroxide, potassium silicate and sodium silicate.

The presence of zinc oxide as described in Example 4 or of an alkali as described in Example 5 effectively maintains the pH of the aqueous medium, in which the zinc phosphate phosphor particles are dispersed, at a pH above 6.50 and below 10. When the entire medium is maintained in this range the zinc phosphate is substantially unaffected by the presence of water.

The process of the invention is effective in water-stabilizing any zinc phosphate phosphor. Examples of zinc phosphate phosphors which may be water-stabilized by the invention are: $\alpha$-$3ZnO.P_2O_5$:Mn, $\beta$-$3ZnO.P_2O_5$:Mn, $\gamma$-$3ZnO.P_2O_5$:Mn, $2ZnO.P_2O_5$:Mn, $3ZnO.P_2O_5$:Tl $3ZnO.P_2O_5$:Pb, $3ZnO.P_2O_5$:Ag and $3ZnO.P_2O_5$:Sn There have been described improved methods and means for water-stabilizing zinc phosphate phosphors. The methods and means produce improved zinc phosphate luminescent materials and the methods included in improved processes for preparing luminescent screens.

What is claimed:

1. A method of water-stabilizing finely-divided zinc phosphate phosphor particles prior to deposition on a support including mixing into an aqueous medium (1) the zinc phosphate phosphor particles and (2) sufficient free zinc oxide to maintain said mixture in the range of pH between 6.5 and 10.

2. A method of water-stabilizing finely-divided zinc phosphate phosphor particles prior to deposition on a support including mixing into an aqueous medium (1) the zinc phosphate phosphor particles and (2) sufficient free zinc oxide to maintain said mixture in the range of pH between 6.5 and 10, said zinc oxide comprising 0.4 to 4 weight percent of said phosphor.

3. A method for water-stabilizing finely-divided zinc phosphate phosphor particles prior to deposition on a support including dispersing finely-divided zinc oxide particles in an aqueous medium, said zinc oxide comprising 0.4 to 4 weight percent of said phosphor, and then contacting said phosphor particles with said aqueous medium.

References Cited in the file of this patent

UNITED STATES PATENTS

| | | |
|---|---|---|
| 2,528,384 | Mitchell | Oct. 31, 1950 |
| 2,647,841 | Perl | Aug. 4, 1953 |
| 2,676,110 | Hesse | Apr. 20, 1954 |
| 2,704,726 | Markoski | Mar. 22, 1955 |

OTHER REFERENCES

Smith: J. Electrochem. Soc., September 1951, vol 98, No. 9, pp. 363–368.